United States Patent [19]

Miner et al.

[11] 4,096,480
[45] Jun. 20, 1978

[54] AIR TARGET FUZE TIME-GATED DECISION CIRCUIT

[75] Inventors: Mark S. Miner, Washington, D.C.; Charles W. Crickman, Glen Echo Heights, Md.

[73] Assignee: The United States of America as represented by the Secretary of the Army, Washington, D.C.

[21] Appl. No.: 738,714

[22] Filed: Jun. 10, 1968

[51] Int. Cl.² .......................... G01S 3/06; F42C 13/02
[52] U.S. Cl. ............................. 343/100 LE; 343/5 R; 343/18 E; 102/214
[58] Field of Search ................ 343/100.12, 5, 100 LE, 343/5 R; 102/70.2 P

[56] References Cited

U.S. PATENT DOCUMENTS

| | | | |
|---|---|---|---|
| 3,000,007 | 9/1961 | Hansford et al. | 343/5 |
| 3,094,695 | 6/1963 | Jahn | 343/100.12 UX |
| 3,177,489 | 4/1965 | Saltzberg | 343/100.12 UX |

Primary Examiner—Maynard R. Wilbur
Assistant Examiner—Richard E. Berger
Attorney, Agent, or Firm—Nathan Edelberg; Robert P. Gibson; Saul Elbaum

[57] ABSTRACT

A decision circuit for use in pulse doppler proximity fuzes having three inter-connected time-gated detection channels. The logical pattern of combining the outputs of these detection channels allows a pulse doppler fuze to operate more effectively in an ECM and clutter environment.

5 Claims, 3 Drawing Figures

ANTENNA BEAM CONFIGURATIONS

AIR TARGET FUZE TIME-GATED DECISION CIRCUIT

RIGHTS OF THE GOVERNMENT

The invention described herein may be manufactured, used, and licensed by or for the United States Government for governmental purposes without the payment to us of any royalty thereon.

BACKGROUND OF THE INVENTION

In the design of pulse doppler radar fuzes it is necessary to meet and solve the problems surrounding the provision of means by which the fuze can operate normally in the presence of ground clutter and various types of electronic counter-measures. For example, it is desirable to have a fuze which will operate normally in the presence of ground clutter, will not be fired when subjected to side lobe jamming, will function normally in a benign electronic counter-measures environment and will fire when a strong jamming signal is directed into the main beam. There have been numerous attempts previously to solve each of these problems separately. The circuit designs resulting from these solutions, however, have proven generally to be incompatible making it virtually impossible to obtain a fuze which will operate normally when subjected to all of the aforementioned difficulties. Further, previous solutions offered to meet these problems, especially those directed to electronic counter-measures, have tended to degrade the performance in reliability of the fuzes normal target sensing operation in a benign environment.

The principal solution offered previously to meet the problem of clutter and incoherent electronic counter-measures has been the use of frequency discrimination. That is, previous fuzes have provided two receiver channels of different bandpass frequencies which would separate the desired from the undesired signals reaching the fuze receiver. But, as will be discussed further hereinbelow, this has proven to be an incomplete solution.

The most serious difficulties occur when the fuze is required to function properly in the presence of severe electronic counter-measures interference. The most probable threat is considered to be the self-screening jammer, that is, where the target aircraft carries its own source of jamming signal. The other type of jamming is provided by the so-called stand-off jammer which is a ground based or airborne station which provides a jamming signal which shields the target aircraft. The threat from the self-screening jammer, however, is considered most probable since the source of jamming radiation is aboard the target aircraft and there is no question as to relative range and location of the jammer and the target such as exists for the stand-off jammer. The effectiveness of the airborne stand-off or escort jammer would depend in large measure on the range and position of the jamming aircraft relative to the fuze and the fuzes antenna pattern for the brief time it is active during the target intercept phase. Therefore, while the fuze design must attempt to minimize the susceptibility to the stand-off jammer, knowledge of the tactical air-borne electronic counter-measures environment during the intercept in which the fuze is to be used is required to actually evaluate the vulnerability of the fuze to stand-off jamming under the particular circumstances. Lacking this information it will be assumed herein that the stand-off jammer is a real potential threat but second in importance to the self-screening jammer which constitutes a threat more real than potential. Obviously, it would be desirable that any protective means designed to shield a proximity fuze from electronic counter-measures jamming in an environment where the different types of jamming are present be able to discriminate these various different types. Unfortunately, the simple protective devices which cause a fuze to fire or not to fire in particular jamming situations do not suffice for those situations in which more sophisticated jamming techniques are used. That is, self-screening jamming and stand-off jamming impose conflicting requirements on any protective circuitry with the result that many of the simple devices used heretofore will not operate properly in such environments.

An electronic counter counter-measure remedy previously proposed for use in an environment where both stand-off jamming and self-screening jamming are present was to add a separate receiver channel and antenna to guard the fuze antenna side lobes. The guard channel would be a broad beam receiving channel adjusted to exceed the fuze antenna side lobe gain but less than the fuze main beam gain which would subtract from the normal fuze receiver output. The effect of this device would be to provide a geometry discrimination by forcing the self-screening jammer into the fuze main beam to cause the fuze to function. That is, it would provide a situation in which a jamming signal in the main beam would cause the fuze to fire but a similar signal in the side lobes would be prevented from causing the fuze to fire. But, this technique proved to be an incomplete solution to the problem. While the guard channel circuitry has merit in defeating the self-screening jammer, it could not be properly integrated into a fuze system which would also provide satisfactory rejection of ground clutter. The use of this electronic counter countermeasure technique presented other difficulties including a lack of any protection against the stand-off jammer in the main beam; a lack of capability of seeing targets in the forward side lobes, hence, the inability to fuze the collision course target; possibility of a fuze dud due to a stand-off jammer in the side lobe nulls; and the rather critical adjustments required to set the proper relationship between the guard beam, the main beam, and the side lobe gain and the possible lack of sensitivity if this relationship were disturbed for any reason.

Because the prior art systems discussed above generally require a relatively high pulse repetition frequency, dudding due to ground clutter can conceivably occur over an uncomfortably large portion of possible target engagement altitudes. This is due to the fact that the density of altitude clutter zones is proportional to the pulse repetition frequency.

It is therefore an object of this invention to provide a means which will allow a pulse doppler radar fuze to meet the conflicting requirements of being able to discriminate against ground clutter and side lobe jamming and to fire on a strong jamming signal in the main beam while being able to function normally in a benign electronic counter-measure environment.

It is a further object of this invention to provide a means which will allow a pulse doppler radar fuze which will be substantially unaffected by ground clutter.

Another object of this invention is to provide a means which will allow a pulse doppler radar fuze to meet the above objects while maintaining adequate sensitivity and sufficient reliability.

SUMMARY OF THE INVENTION

The aforementioned and other objects are obtained by using an air target proximity fuze in which there are three detection channels which are range gated. Two such channels are connected in parallel to receive the signal from a main antenna. One such channel is gated to receive valid target signals and the other is set to receive signals of other ranges. The outputs of these channels are algebraically added. The fuze is provided with a guard antenna the output of which is coupled to a range gated detection channel. The output of the guard detection channel is algebraically added to the main detection channel range gated for invalid signals. Depending on the levels of the algebraic signals either one of these may fire the fuze.

BRIEF DESCRIPTION OF THE DRAWINGS

The specific nature of the invention as well as other objects, aspects, uses and advantages thereof will clearly appear from the following description and the accompanying drawing in which.

DESCRIPTION OF THE PREFERRED EMBODIMENT

Figure 1:
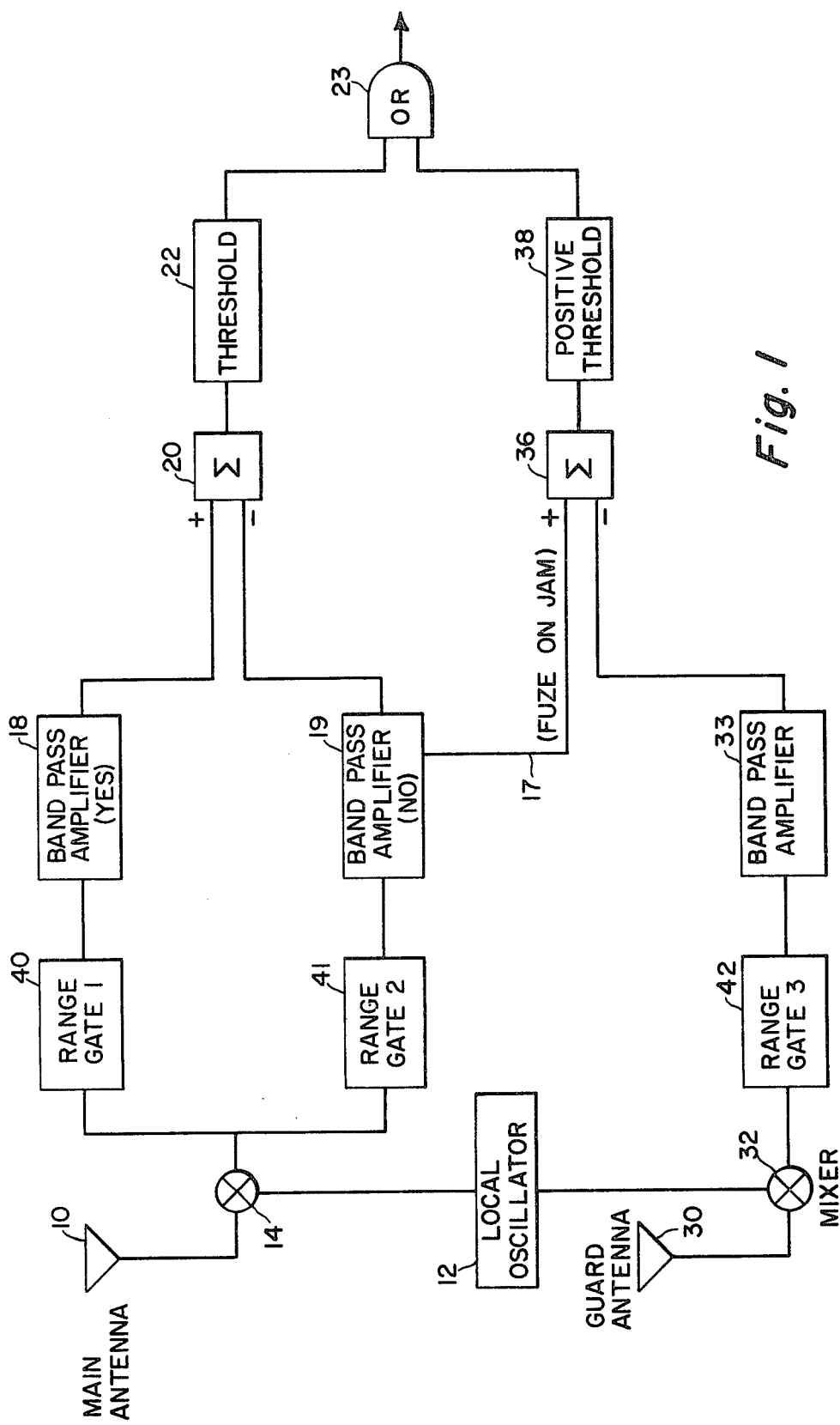
FIG. 1 is a block diagram of the proximity fuze decision circuit of our invention.

In FIG. 1, the block diagram of the decision circuit for proximity fuzes of our invention, signals entering a main antenna 10 are mixed with the output of a local oscillator 12 in a mixer 14 and are coupled to two range gates 40 and 41 in parallel channels. The outputs of the range gates 40 and 41 are amplified and detected in amplifiers 18 and 19, respectively, which have the same band pass corresponding to the expected range of the target doppler signals. Amplifier 18 and amplifier 19, which has a higher gain than amplifier 18, produce DC signals the levels of which correspond to the levels of the signals entering the amplifiers; amplifier 18 produces a positive signal, and amplifier 19 produces a negative signal. The outputs from amplifiers 18 and 19, respectively, are coupled to a summer 20 where they are added algebraically resulting in the signal representing the algebraic sum of the two amplifier outputs signals being coupled to a threshold detector 22. Threshold detector 22 is adjusted so that, if the output signal from summer 20 is positive, a signal will be coupled from threshold detector 22 to an OR gate 23 the output of which causes the fuze to fire.

The guard antenna channel has a separate mixer 32 coupled to the output of guard antenna 30 and to local oscillator 12 so that the local oscillator signal will be mixed with the guard antenna output as well. The signal from mixer 32 is coupled to a range gate 42, set to operate at the same time as range gate 41, and the output of range gate 42 is coupled to an amplifier 33 which has a band pass the same as that of amplifiers 18 and 19. The output of amplifier 33 is a negative DC signal the level of which is dependent on the level of the signal coupled into the amplifier. At this point, it will be noticed that another output is made available from amplifier 19 on lead 17. This signal, a detected signal, is a positive DC signal emanating from a lower gain point in amplifier 19. The signal on lead 17 and the output of amplifier 33 are coupled to a summer 36 in which they are algebraically added, and the signal representing that algebraic sum is connected to a threshold detector 38. In the case of threshold detector 38, however, the level is adjusted such that an output is made available only when the input exceeds a preset positive DC level. If that level should be exceeded, an output from the threshold detector 38 will be directed to OR gate 23.

Figures 2, 3:
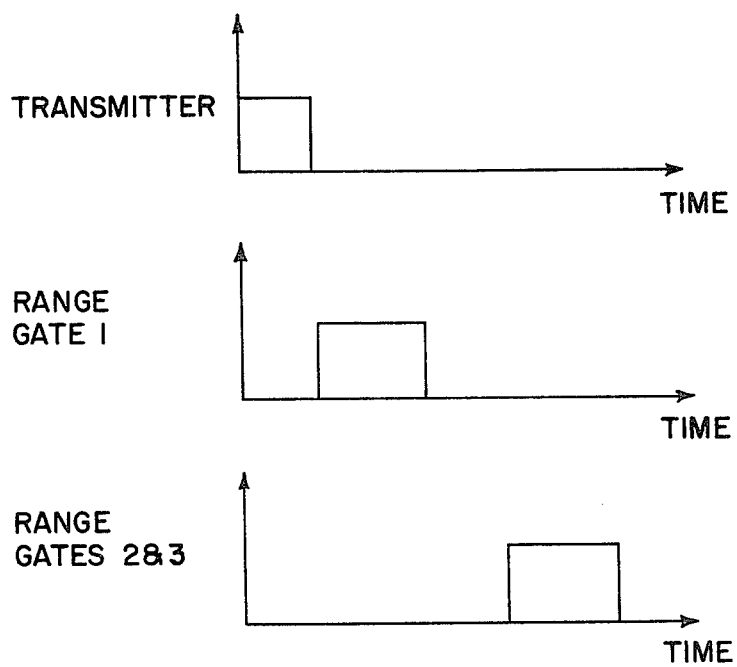
FIG. 2 is a diagram of the antenna patterns of the main antenna and the guard antenna in the decision circuit of our invention.
FIG. 3 is a timing diagram showing typical range gating of the proximity fuze decision circuit of our invention.

FIG. 2 illustrates the antenna beam patterns for main antenna 10 and guard antenna 30. Pattern 45 represents the main beam of main antenna 10 and lobes 47 represent the side lobes of the main antenna. Pattern 46 represents the antenna pattern for guard antenna 30. The gain of the guard antenna is adjusted to be greater than that of the side lobes 52 of the main antenna but less than the gain of the main beam 45 of the main antenna.

FIG. 3 illustrates the responses of the range gates relative to the time of transmission of a signal. It will be noticed that range gates 41 and 42 are set to operate at the same point in time to receive invalid target echoes arriving later than the echo of valid signals. Of course, other desired settings may be used.

In order to properly describe the operations of our invention it will be necessary to discuss its operation under different signal situations, but it will be readily apparent that the circuit will function properly when more than one of these situations are present. When a valid target which is close enough to the fuze that its echo falls only within range gate 40, it will cause an output from amplifier 18, but not the others. The threshold of level sensor 22 will be exceeded, and the OR gate 23 will pass a firing signal to the warhead. If, however, the target is far enough away that its echo falls only within range gate 41, a negative signal will be seen at threshold detector 22 producing a negative output from summer 20 which, of course, will not exceed the threshold level of level sensor 22. The positive threshold of level sensor 38 is set high enough that it will not be exceeded by a target signal in this situation.

If a CW jammer appears in the main beam side lobes, which means that it will also appear in the guard beam, its signal will be passed by all three range gates. Because the gain of amplifier 19 is greater than that of amplifier 18, the output of summer 20 will be negative, and the threshold of zero threshold detector 22 will not be exceeded. Further, because the gain of the guard antenna equals or exceeds the gain of the main antenna side lobes, the output of summer 36 will be either zero or negative, and the threshold of positive threshold detector 38 will not be exceeded. Thus, a CW jammer will produce no input to the OR gate, and the warhead will not be activated.

When the strong self-screened target enters the main beam of antenna 10, because the gain of amplifier 19 exceeds that of amplifier 18, the threshold of threshold detector 22 will not be exceeded, but the voltage on lead 17 will be larger and the output voltage from amplifier 33. The latter fact is true because the gain of the main lobe of antenna 10 exceeds the gain of guard antenna 30. Therefore, if the self-screened jammer is close enough making its signal large enough, the threshold of positive threshold detector 38 will be exceeded, and the OR gate will pass a firing signal to the warhead.

The above described decision circuit essentially alleviates the problem of clutter. Because the density of altitude clutter zones is proportional to the pulse repetition frequency, and because the use of time gating permits a much lower pulse repetition rate than is used with conventional frequency discrimination circuits, the clutter problem is essentially reduced to insignificance.

When the decision circuit of our invention is used in proximity fuzes, there is no desensitizing effect by the guard channel on target echoes received in either the main beam or side lobes of the main antenna 10. Therefore, guard antenna design and adjustment are less critical and cannot degrade normal fuze performance in a benign environment. The added electronic counter counter-measures circuitry is independent of normal target sensing operations and therefore cannot degrade the performance or reliability of the fuze when no clutter or jamming signals are present. Furthermore, the high power self-screening jammer is effectively defeated, and the standoff or escort jammer is discriminated against to a very high degree. The stand-off jammer cannot cause the fuze not to dud by directing jamming power into the nulls of the main antenna pattern. This feature negates a disadvantage of the prior art circuit in which a guard channel was used and in which the fuze could be overguarded and, hence, caused not to fire by jamming power in the guard beam and not in the narrow antenna side lobe beams. In conclusion it can be said that the decision circuit of our invention as described hereinabove offers a very good compromise to achieving reliable air target fuzing in all of the interference environments assumed.

It will be apparent that the embodiment of our invention shown is only exemplary, and, although it was described in the context of its use for air target fuzing, it will be apparent that other uses are applicable and that various modifications can be made in the construction and arrangement within the scope of the invention as defined in the appended claims.

We claim as our invention:

1. A decision circuit for a proximity fuze comprising:
    (a) a first antenna connected to a first receiver channel, said first antenna having a pattern having a main beam and a plurality of side lobes;
    (b) a second antenna connected to a second receiver channel, said second antenna having a pattern having a broad beam and a gain of less than said main beam but greater than the gain of said side lobes of said first antenna;
    (c) a first range gated means in said first receiver channel to detect and amplify a valid target return signal;
    (d) a second range gated means in said first receiver channel to detect and amplify target signals arriving at time other than said valid target return signal, said second means having a higher gain than said first means;
    (e) a first comparison means for producing a signal when the output of said first means exceeds the output of said second means;
    (f) a third range gated means in said second receiver channel to detect and amplify signals arriving in the same time period as signals received by said second range gated means; and
    (g) a second comparison means for producing a signal when an output from said second range gated means taken at a lower gain point than said output compared with the output of said first range gated means exceeds the output from said third range gated means by a predetermined difference.

2. The decision circuit of claim 1 in which the output of said first and said second range gated means produce DC signals proportional to the input signals to said first and said second range gated means, respectively, and of opposite polarities, and the output from said lower gain point of said second range gated means and the output from said third range gated means are DC signals of opposite polarities.

3. The decision circuit of claim 2 in which said first and said second comparison means each comprise a summer for algebraically adding the inputs connected thereto and a threshold detector connected to the output of each of said summers.

4. The decision circuit of claim 1 in which an OR gate is connected to the output of said first comparison means and to the output of said second comparison means producing an output when said OR gate receives a signal from either of said comparison means.

5. The decision circuit of claim 1 in which the target return signal is a doppler echo signal and in which said second range gated means and said third range gated means are adjusted to detect and amplify target return signals arriving in a time period later than the expected time of arrival of a valid target return signal.

* * * * *